Figure 4:
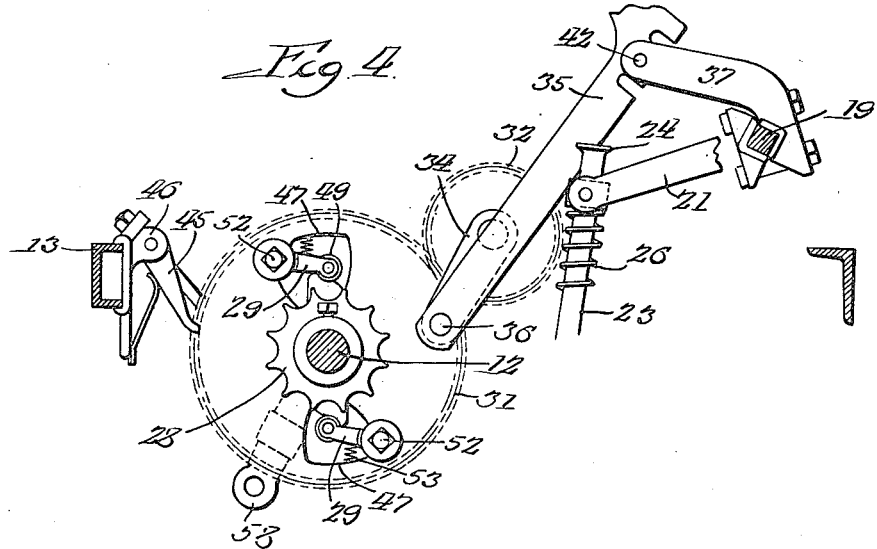

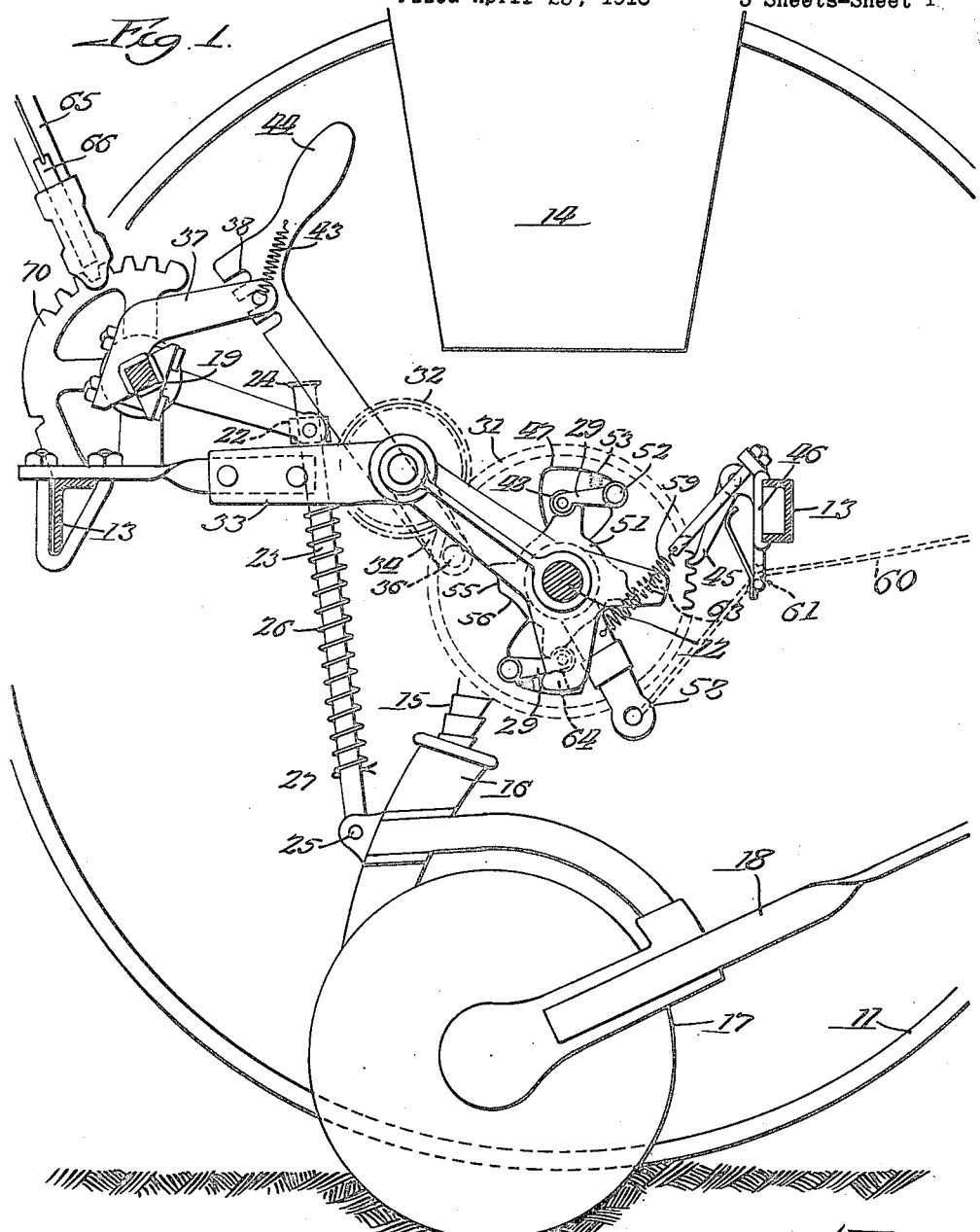

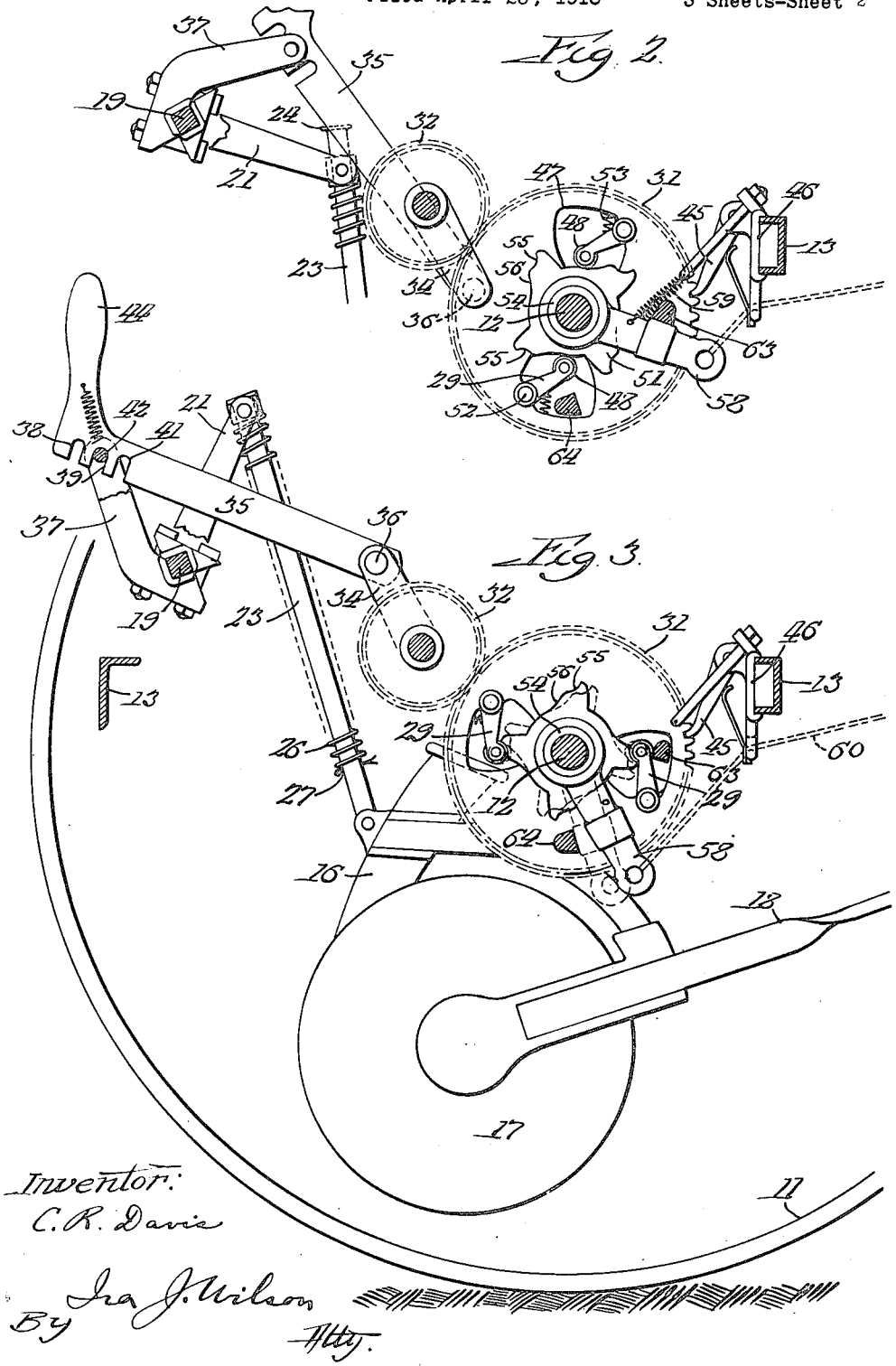

July 31, 1923.

C. R. DAVIS

POWER LIFT FOR GRAIN DRILLS

Filed April 23, 1918

1,463,612

3 Sheets-Sheet 3

Inventor:
Calvin R. Davis

By Ira J. Wilson
Atty.

Patented July 31, 1923.

1,463,612

UNITED STATES PATENT OFFICE.

CALVIN R. DAVIS, OF ROCKFORD, ILLINOIS, ASSIGNOR TO EMERSON-BRANTINGHAM COMPANY, OF ROCKFORD, ILLINOIS, A CORPORATION OF ILLINOIS.

POWER LIFT FOR GRAIN DRILLS.

Application filed April 23, 1918. Serial No. 230,211.

*To all whom it may concern:*

Be it known that I, CALVIN R. DAVIS, a citizen of the United States, residing at Rockford, in the county of Winnebago and State of Illinois, have invented certain new and useful Improvements in Power Lifts for Grain Drills, of which the following is a specification.

This invention relates in general to grain drills of the type having one or more gangs of drills or soil openers adapted to be raised from and lowered to a working position, and has more particular reference to the provision of power-operated mechanism for raising and lowering the drills.

The primary object of my present invention is to provide a generally improved mechanism by means of which the drills or soil openers may be raised and lowered by power and also by manual operation. This mechanism, as will appear hereinafter, is so designed that an operator on a tractor behind which the drill is drawn, may cause the drills to be raised and lowered by simply actuating a cord or the like, that is, by pulling the cord once the drills will be raised, and upon again pulling the cord they will be lowered into working position.

Another object is to quickly operate the raising and lowering mechanism from one of the carrying wheels so as to avoid stretches of faulty planting occasioned by slow raising and lowering of the drills, which is characteristic of power operated mechanism heretofore provided. One condition which renders accomplishment of this object difficult, is that grain drills are provided with carrying wheels of comparatively large diameter and that the linear travel of the machine over the ground is long compared with the movement of the axle, from which latter it is found most practical to derive power for operating the raising and lowering mechanism. Another is, that in grain drills of this character the driving connection between the wheels and the seeding mechanism is engaged and disengaged simultaneously with lowering and raising of the drills, so that, where gears are brought into and out of mesh in the driving connection, the raising and lowering movements must necessarily be comparatively quick in order to prevent jamming and nipping of the gear teeth. With these conditions in mind, I have provided novel mechanism by which the drills may be completely raised in a quarter revolution of the carrying wheels and lowered in a quarter revolution, it being manifest that the effect of this is to quickly raise and lower the drills.

In drills of this class the soil openers are held in working position under a spring pressure so that each soil opener is free to rise against such yielding pressure if an obstruction is encountered, and will, under the influence of such pressure, resume its working position after passing over the obstruction. I have aimed in the present invention to provide mechanism which will lower the drills or soil openers fully into working position and still retain the desired spring pressure on the drills without any manual operation of levers or other pressure devices. Thus, the complete operation of raising and lowering from and to working position is automatically and mechanically performed upon operating at will a cord or other control means.

A further object of my invention is to provide improved mechanism by which the drills may be raised and lowered either manually as by operation of a hand lever, or by power, such as derived from a carrying wheel, without adjustment or derangement of any of the mechanism. Thus, raising and lowering of the drills is not dependent upon movement of the machine over the ground and the operator may, as is often desired, raise or lower the drills by hand when the machine is at a standstill.

I have also aimed to design a raising and lowering mechanism which may be applied to drills of standard construction, because of its compactness, simplicity and peculiar adaptability therefor; and I have further aimed to so construct the mechanism that it will not only serve in a practical and satisfactory manner the purposes desired, but will be capable of production at a comparatively low cost.

These and other objects and attendant advantages will be appreciated by those skilled in the art as the invention becomes better understood by reference to the following description when considered in connection with the accompanying drawings, in which—

Figure 5:
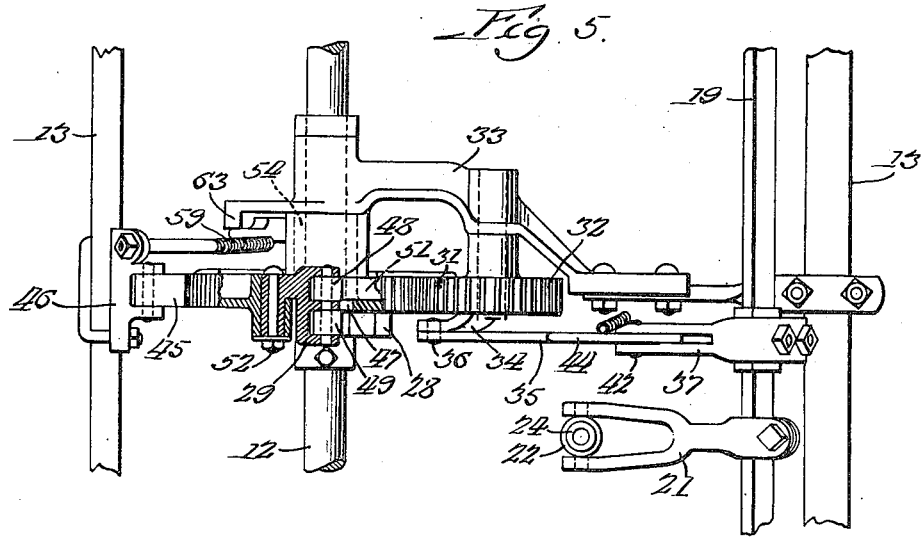

Figure 1 is a vertical sectional view through a seeding machine embodying my improvements, showing the disk drill or soil opener in working position in the ground and illustrating simply in a diagrammatic manner certain parts of the machine not directly pertinent to my present improvements;

Fig. 2, a fragmentary view of the raising and lowering mechanism shown in Fig. 1, with the control element actuated to cause the drills to be raised;

Fig. 3, a similar fragmentary view showing the position of the parts with the drills raised;

Fig. 4, a fragmentary view looking at the side of the raising and lowering mechanism opposite from that shown in Fig. 1; and Fig. 5, a plan view partially in section, of the mechanism shown in Fig. 4.

While my improvements have been especially designed for use on grain drills, it should be understood that the present invention contemplates the adaptability of such improvements to various farming implements, such as seeding machines, fertilizer distributers, etc., in which one or more gangs of drills or soil openers are moved into and out of working position in the ground. The machine which I have illustrated but partially in the drawings, is one of a well known class of grain drills; hence, I have deemed it necessary to illustrate in detail only such parts as are necessary for a clear understanding of my present improvements. Machines of this class generally comprise a pair of carrying wheels 11 of relative large diameter, an axle 12 carried by the wheels and having the usual ratchet connection therewith so that the wheels will drive the axle only when moving forwardly, and a suitable frame designated generally by character 13, mounted on the axle 12 and supporting thereabove a seed hopper 14, which extends substantially co-extensive with the length of the axle. Seed distributing or feed mechanism, not shown, delivers seed or fertilizer, as the case may be, from the hopper into a plurality of flexible conduits or tubes 15 each leading down to and entering a delivery boot 16, from the lower end of which the seed is dropped into a furrow formed in the ground by a soil opener, such for example as a disk opener 17. This structure, generally referred to as a drill, is suitably connected to a drag bar 18 pivotally mounted at its forward end on the frame of the machine so that the drill may be lowered and raised to and from working position. The drills, generally of the single disk, double disk or shoe type, are arranged in laterally spaced relation beneath the machine. It is common practice to raise and lower by manual operation of a lever, a gang of such drills; and in relatively wide machines two or more gangs of drills are employed, each adapted to be independently raised and lowered by a separate lever. Mechanism has also been provided for raising the gangs by power derived from the carrying wheels as the machine is drawn over the ground, but so far as I am aware, the mechanisms heretofore provided for this purpose do not permit of the quick action desired and of convenient and satisfactory operation by both the power and manually operable mechanisms. It is now desired to hitch these larger grain drills, that is, those having two or more gangs of soil openers, behind a traction engine and to enable the operator on the tractor to raise and lower the gangs by simply actuating the control means, such for example as by pulling a cord to put the mechanism on the grain drill into operation. It is to this subject matter that my improvements have special reference.

Referring now to Fig. 1 of the drawings, it will be noted that the seed boot 16 is connected to a rock shaft 19 mounted on the frame in parallel relation with the axle 12, through the intermediary of a forked arm 21 fixed to the rock shaft 19 and equipped at its free end with a trunnion collar 22 through which is slidably disposed, a connecting rod 23 having a headed upper end 24 and connected at its lower end at 25, to the boot 16. An expansion spring 26 coiled about the rod 23 intermediate the collar 22 and the pin 27, constantly urges the seed delivery boot and its soil openers downwardly until limited by contact of the end 24 of the rod against the collar 22. A series of drills connected in a similar manner to the rock shaft 19 is referred to in this application as a gang of drills or soil openers; and in a relatively wide machine two or more independent rock shafts 19 are provided, each connected to an independent gang of drills. By rocking each shaft 19, its respective gang may be raised and lowered, and in the present instance, a separate manually and power operated mechanism is provided for operating each rock shaft. The construction and operation of but one such mechanism will now be described.

As mentioned above, I have aimed to raise and lower the soil openers quickly with respect to the linear travel of the machine. This is attained by effecting a complete raising or lowering movement upon each quarter revolution of the carrying wheel. I have, therefore, provided mechanism which when thrown into operation will either raise the drills or lower and fully move them into working position during a quarter revolution of a carrying wheel, and thereupon automatically disengage and cause the parts to be held in the position to which they have been moved. This mechanism comprises a toothed wheel 28 (Fig. 4) fixed to the wheel shaft or axle 12 and adapted to be engaged at predetermined intervals by roller pawls or dogs 29 carried by a gear 31 loose on the wheel shaft for revolving the gear 31 in quarter revolution movements. A driven gear 32 meshing with the gear 31 and mounted on a fixed shaft carried by a fixed bracket designated generally by character 33, is equipped with a fixed crank arm 34, which when revolved imparts raising and lowering movement to the drills through the following means: A link 35 is pivotally connected at 36 to the crank arm and adapted to be pivotally connected at its opposite end in any of a plurality of adjustments, to an arm 37 fixed to the rock shaft 19. In the present instance the link 35 is provided with a series of notches 38, 39 and 41, in any of which the pin 42 on the arm 37 may be engaged, the link 35 being held against displacement from operative position by a contractile spring 43 between the link and the pin 42 which holds the latter seated in any one of the notches. The link as shown, is provided with a handle 44, the purpose of which will appear hereinafter when considering the manual operation of raising the disks. The notches 38, 39 and 41 allow relative adjustment between the link 35 and the arms 37 for varying the working depth of the drills, it being manifest, viewing Fig. 1 (the pivot 36 being stationary), that when the pin 42 is engaged in the notch 38 the soil openers will work at a minimum depth, and that when the pin 42 is engaged in the notch 41 the maximum working depth is obtained. This adjustment is secured by simple manipulation of the link 35 to engage whichever notch is desired, with the pin 42, the spring 43 holding the parts in the adjusted position. The gears 31 and 32 provide a 2 to 1 reduction so that upon each quarter revolution of the drive gear 31 mentioned above, the gear 32 will be revolved a half revolution in which to impart a full raising or lowering movement to the drills. Viewing Fig. 3, which shows the drills in raised position, it will be noted that the weight of the gang of drills is brought to bear on the rock shaft 19 tending to revolve the same in a clockwise direction, and that this influence on the rock shaft is transmitted to the gear 32 tending to revolve the same also in a clockwise direction, and in turn to revolve the gear 31 in the opposite direction, which latter movement is opposed by a spring-pressed pawl or dog 45 pivotally mounted on a bracket 46 secured to a frame bar. Thus, it will also be observed that the link 35 stands in a position with its pivot 36 out of alignment with the shaft and the pin 42, by reason of which arrangement and of the mechanism just described including especially the pawl 45, the weight of the gang serves to lock the gang in elevated position. Upon revolving the driven gear 32 and its crank 34 in a counter-clockwise direction by a clutch mechanism which will be presently described, the pivot 36 will be moved past the dead center just mentioned, whereupon the weight of the gang will tend to revolve the gear 32 in a counter-clockwise direction and the gear 31 in the opposite direction, so that the gang will be free to immediately drop in a quick movement to the ground by its own weight. To force the drills into the ground requires considerable power, and for this purpose, power is applied through the agency of said clutch, as will be presently described. It will be first noted, however, that when the drills have been lowered into working position as shown in Fig. 1, the resistance in holding the drills in the ground will be brought to bear on the rock shaft 19, tending to revolve the same in a counter-clockwise direction, and because of the position of the link 35, to revolve the gear 32 in the same direction and the gear 31 in the opposite, which latter movement is opposed by the pawl 45. Thus, the pawl 45 serves to lock the parts in position when the gang is in both raised and lowered positions, because the weight of the gang when in raised position and the resistance of the gang in lowered position is brought to bear on the driving gear 31, tending to drive it in a common direction opposed by the pawl 45.

Coming now to the clutch mechanism, it is desired to connect the driving gear 31 to the wheel shaft to revolve this gear a quarter of a revolution and thereupon automatically disconnect the gear from the wheel shaft. The pawls 29 mentioned above, are pivotally mounted on the gear 31 on diametrically opposite sides of the wheel shaft and are constructed to extend through openings 47 in the web of the gear so as to carry rollers 48 and 49 on opposite sides of said web as shown in Fig. 5, adapted to engage respectively with a pawl controller designated generally by character 51 and the toothed wheel 28. Viewing Fig. 5, it will be seen that the inner end of the pawl is rotatably seated in a boss formed on the gear and that a bolt 52 passing through the pivoted end of the pawl holds the same against displacement. An expansion spring 53 constantly urges the free end of each pawl inwardly. As shown in Figs. 1 and 4, the pawls are normally held out of engagement with the toothed wheel 28 by means of the pawl controller 51. This pawl controller is a member mounted upon and embracing the hub 54 of the gear 31 and having formed integral therewith a laterally extending operating arm 58 and quarteringly spaced cam surfaces each including a seat 55, a gradually inclined surface 56 at one side of the seat 55 and a sharp decline at the opposite side thereof. When the drills are in working position, as shown in Fig. 1, the pawls are held in a retracted inoperative position by diametrically opposed seats 55 of the pawl controller, the latter being urged in a counter-clockwise direction, viewing Fig. 1, by the contractile spring 59 having just sufficient pressure to hold the said seats 55 in engagement with the rollers 48 and to preclude relative displacement of the pawl controller and pawls as might be occasioned by jarring and vibration of the machine during operation. A cord indicated by character 60, connected to the free end of the arm 58 passing, in this instance, through an eye 61 in the casting 46, may be manipulated by an operator on the tractor for actuating the pawl control member to engage the clutch mechanism just described. When the cord 60 is pulled, the pawl control member will be oscillated in a counter-clockwise direction as shown in Fig. 2, until limited by contact of the arm 58 with a stationary stop or abutment 63 formed integral with the casting or bracket 33 mentioned above. By this movement of the pawl controller, the pawls 29 are permitted to move inwardly under the influence of their respective springs 53 into engagement with the toothed wheel 28, which is constantly revolved with the carrying wheel while the machine is being drawn forward. As a consequence of this engagement of the pawls with the toothed wheel, the gear 31 will be revolved in a clockwise direction viewing Fig. 2, thereby revolving the gear 32 in the opposite direction and moving the link 35 past the dead center relation spoken of above. This movement will continue until the gear 31 has been revolved a quarter of a revolution and the gear 32 a half revolution, that is, to the position shown in Fig. 3, in which the gang of drills has been raised, whereupon the pawls 29 will be automatically disengaged from the toothed wheel by the pawl controller and the gang will be held in elevated position due to the arrangement of the link 35 and the action of the locking pawl 45, in the manner described above. Tracing back now the operation of the pawl controller from the point illustrated in Fig. 2, it will be observed that as the pawls travel in a clockwise direction they will, through contact against the inclined surfaces 56 of the pawl controller, move the latter therewith to the position indicated in dotted lines in Fig. 3, which position is limited by contact of the arm 58 against the fixed stop 64 formed integral with the bracket 33. Upon the final movement of the cam controller arm 58 to said dotted line position shown in Fig. 3, the rollers 48 of the pawls will have almost reached the summit of the incline 56 and thereby have disengaged the rollers 49 from the toothed wheel. This concludes, of course, rotation of the driving gear, and at this point the gang of drills has been elevated. The final movement is to return the arm 58 from the position indicated in dotted lines in Fig. 3 to the full line position shown therein, in which to move the pawl rollers 48 from the summit of the inclines 56 into the seats 55, thus fully withdrawing the pawl rollers 49 from the path of the teeth on the wheel 28 so as to prevent nipping of the rollers on the teeth. This latter movement is effected by the contractile spring 59 as is obvious.

During the operation just described the gang of drills has been raised from working to an elevated position by a quarter of a revolution of the wheel axle, the operation being entirely automatic after actuation of the pawl controller arm 58 by pulling the cord 59. When now it is desired to lower the gang into working position the operator again pulls the cord 59 to engage the pawls of the toothed wheel and revolve the driving gear 31 a quarter of a revolution in the same manner as described above with reference to raising the gang. Particular attention is called in this lowering operation to the fact that the gang of drills drops quickly to the ground and is then forced into working position in the ground by power from the carrying wheels, so that both lowering and raising of the gang through the agency of the power operated mechanism is complete in every respect. When the drills drop quickly to the ground the seeding mechanism (not shown but well understood in the art) is instantly automatically thrown into operation, so that seed is delivered while the drills are being forced into the ground to the desired depth. It will be observed that there is a permanent mechanical connection between the drills and the driving gear or member 31, the only connection which is broken being the clutch connection between this driving gear and the wheel axle. Another important feature is the fact, referred to above, that the link 35 stands in a substantially dead center relation when the gang is in raised and lowered positions and is so disposed that the weight of the gang when in raised position and the tendency of the gang to rise from working position is brought to bear on the driving gear or member 31 in a common direction so that a single pawl 45 may be employed to lock the parts in these positions. The foregoing features all tend toward simplicity in construction and operation and enable the desired operations to be performed in a most practicable manner.

The power operated mechanism just described, depends in the present instance, upon power derived from the wheel axle by travel of the machine forwardly; hence, when the machine is standing still such mechanism cannot be employed for raising the drills unless some other source of power is used. I have, therefore, provided means for manually raising or lowering the drills when the machine is at rest and for enabling this operation to be performed without interfering in any way with the power mechanism. Fixed to the shaft 19 is an ordinary hand lever 65 having the usual spring-pressed dog 66 co-operable with a notched segment 70 mounted on the frame. The sliding dog of this lever is normally held out of engagement with the segment 66 by any suitable means, such for example, as a ring (not shown) slipped over the finger lever which actuates the dog. With the hand lever thus disengaged from its segment the power mechanism may be operated as much as is desired and the lever will simply swing idly backward and forward as the gang is raised and lowered. When it is desired to raise the drills from working position by hand, the operator standing behind the machine grasps the handle 44 of the link 35, draws rearwardly on said handle so as to rock the link as a bell crank lever about the pin 42 and thus moves the pivot 36 past the dead-center relation so that the parts connected with the rock shaft 19 may be operated by the hand lever 65. The operator may now draw the hand lever 65 rearwardly and downwardly until the gang has been fully raised, in which position it will be automatically locked by the same mechanism and in the same manner that it is locked when elevated by the power mechanism. During this manual operation the driven gear 32 will be revolved a half revolution in a counter-clockwise direction and the drive gear 31 will, of course, be revolved a quarter of a revolution in the opposite direction so that its pawls 29 are simply advanced a quarter of a revolution and engaged in the next succeeding seats 55 of the pawl controller. To lower the gang by hand the operator simply presses forwardly on the hand lever 44 so as to rock the pivot 36 in a counter-clockwise direction beyond the dead center, whereupon the gang will be free to fall to the ground and may be fully moved by manual operation of the hand lever 65 to working position in the ground, in which the gang will be automatically locked the same as when lowered to such position by the power mechanism. It will be noted that the hand lever 65 need not be associated with a notched segment, as the latter is used only in cases of emergency and may be supplied with a drill as standard equipment so that the power mechanism may be interchangeable without affecting the hand lift.

It is believed that the foregoing conveys a clear understanding of the objects prefaced above and of the principles and operation of my improvements, and it should be understood that while I have illustrated and described one working embodiment thereof, various changes might be made in the construction and arrangement without departing from the spirit and scope of the invention as expressed in the appended claims, in which:

I claim:

1. In a seeding machine, the combination of a gang of drills, a wheel shaft, a rock shaft and connections therefrom to the drills so that upon rocking the shaft the drills will be raised and lowered, a driving gear loose on the wheel shaft, a driven gear in mesh with said driving gear and having a connection with said rock shaft constructed so that during a complete revolution of the driving gear the rock shaft will be operated to fully raise and lower the drills, a toothed driving member fixed to the wheel shaft, a pawl carried by the driving gear and adapted to engage said toothed driving member, a pawl control member adapted to oscillate about the wheel shaft and having circumferentially spaced surfaces for holding the pawl out of engagement with said toothed member and for allowing upon oscillation of the control member the pawl to operatively engage said toothed member.

2. A power lift for seeding machines comprising a gang of drills, a wheel shaft, and means operable from the wheel shaft for raising and lowering the drills including a connected crank and a link movable into substantially dead-center relation when the drills are raised and lowered, means for automatically preventing said crank and link from passing the dead-center when the drills have been moved to raised and lowered positions, whereby the drills are held in such positions, manually operable means for moving said crank and link beyond said dead-center relation, and means operated independently of power from said wheels for raising the soil openers after the crank and link have been moved beyond said dead-center relation.

3. In a grain drill, the combination of a gang of drills, a wheel shaft, a driving and a driven member having a two to one reduction, means for connecting the driving member to the wheel shaft at will and for automatically disconnecting it therefrom when said member has been revolved a quarter revolution, a link connected with the drills and having an eccentric connection with the driven member disposed so that at the end of each half revolution of said driven member the link will stand in a substantially dead-center position, means for manually moving said link beyond said dead-center position, and means whereby the drills may be manually raised independently of movement of the wheel shaft.

4. In a grain drill, the combination of a gang of drills, a shaft driven from one of the carrying wheels, a driving and a driven member, the former of which is loosely revoluble about said shaft, a toothed wheel fixed to the shaft, a pawl carried by the driving member and adapted to engage said toothed wheel, a cam controller adapted to oscillate about said shaft and provided with a cam surface shaped for normally holding the pawl out of engagement with said toothed wheel and for allowing, upon oscillation of said member, the pawl to be moved into driving connection with said toothed member and to subsequently disengage the pawl from said driving connection, a connection between the driven member and the drills for raising and lowering the latter upon two successive operations of the driving member, and means for oscillating said pawl control member at will, whereby to raise and lower the drills.

5. In a grain drill, the combination of a gang of drills, a wheel shaft, a crank member, means for connecting the crank member to the wheel shaft at will and for automatically disconnecting it therefrom when the crank member has revolved a half revolution, a connection between the drills and crank member including a part movable to a substantially dead-center relation when the drills have been raised and lowered, means for automatically preventing said part from passing said dead-center relation, means operable at will for establishing driving connection between the wheel shaft and crank member whereby said part will be operated to raise and lower the drills, means independent of the last named means for manually moving said part past said dead-center relation, and means whereby the crank member may be manually operated for raising the drills.

CALVIN R. DAVIS.